US012753829B2

(12) United States Patent
Wu et al.

(10) Patent No.: US 12,753,829 B2
(45) Date of Patent: Oct. 6, 2026

(54) LINEAR DRIVING MECHANISM WITH INTEGRATED HOUSING HAVING GEAR RING AND SLIDE RAIL

(71) Applicant: AAC MICROTECH (CHANGZHOU) CO., LTD., Changzhou (CN)

(72) Inventors: Jinguo Wu, Changzhou (CN); Sensen Yang, Changzhou (CN); Junsheng Wang, Changzhou (CN); Feng Yan, Changzhou (CN)

(73) Assignee: AAC MICROTECH (CHANGZHOU) CO., LTD., Changzhou (CN)

( * ) Notice: Subject to any disclaimer, the term of this patent is extended or adjusted under 35 U.S.C. 154(b) by 0 days.

(21) Appl. No.: 19/328,292

(22) Filed: Sep. 15, 2025

(65) Prior Publication Data

US 2026/0132841 A1 May 14, 2026

Related U.S. Application Data

(63) Continuation of application No. PCT/CN2024/131575, filed on Nov. 12, 2024.

(51) Int. Cl.
*F16H 25/20* (2006.01)

(52) U.S. Cl.
CPC ..... *F16H 25/20* (2013.01); *F16H 2025/2031* (2013.01); *F16H 2025/2075* (2013.01); *F16H 2025/2087* (2013.01)

(58) Field of Classification Search
CPC ................................................ F16H 2025/2087
See application file for complete search history.

(56) References Cited

U.S. PATENT DOCUMENTS

| | | | | |
|---|---|---|---|---|
| 5,406,154 A * | 4/1995 | Kawaguchi | ............. B60L 50/60 | 310/43 |
| 2016/0144694 A1* | 5/2016 | Shchokin | ................. B60J 5/107 | 475/331 |
| 2020/0291710 A1* | 9/2020 | Kummer | .................... B60J 5/10 | |

FOREIGN PATENT DOCUMENTS

| | | |
|---|---|---|
| CN | 213402716 U | 6/2021 |
| CN | 216056530 U | 3/2022 |

(Continued)

OTHER PUBLICATIONS

Xu, Microcellular plastic injection molding technology, 2013, p. 128.

(Continued)

*Primary Examiner* — Minnah L Seoh
*Assistant Examiner* — Gregory T Prather

(57) ABSTRACT

Provided is a linear driving mechanism including a driving assembly and a transmission assembly fixedly connected to each other. The driving assembly drives the transmission assembly to move. The transmission assembly includes a second housing including a hollow housing body, a gear ring formed by an end of the housing body close to the driving assembly, and a slide rail formed by recessing the housing body from an end away from the driving assembly. The gear ring is engaged with the gear assembly, and the stator assembly drives the rotor assembly to rotate the screw rod, to cause the push rod to realize the linear telescopic movement. The present application integrates the slide rail, the gear ring, and the housing to form the second housing, and the second housing is injection molded in one piece using high-strength plastic particles, which facilitates mass production and ensures more stable dimensions.

11 Claims, 5 Drawing Sheets

(56) References Cited

FOREIGN PATENT DOCUMENTS

| | | | |
|---|---|---|---|
| CN | 218416091 | U | 1/2023 |
| CN | 117713441 | A | 3/2024 |

OTHER PUBLICATIONS

Duoren Wang, Green Nanochemicals, 2007, p. 270.
A Nikolaev, Welded Brackets, Tie Rods, Bearings, Welding Structures Theory and Application, 1956, pp. 557-560.
Qingchun Hu et al., Mechanical and manufacturing engineering training innovative design and production tutorial, 2013, pp. 114-116.
Yunwen Shen et al., Theory and Design of Harmonic Drive Gears, 1985, pp. 190-204.

* cited by examiner

LINEAR DRIVING MECHANISM WITH INTEGRATED HOUSING HAVING GEAR RING AND SLIDE RAIL

CROSS-REFERENCE TO RELATED APPLICATIONS

This is a continuation of International Application No. PCT/CN2024/131575, filed on Nov. 12, 2024, the entire contents of which are incorporated herein by reference.

TECHNICAL FIELD

The present application relates to the field of linear driving technologies, in particular to a linear driving mechanism.

BACKGROUND

With the current rapid development of artificial intelligence and the robotics industry, the fingers of humanoid robots are an important part of their realization of actions to complete tasks. Due to the requirements of space, energy-saving, and other requirements for linear actuators to put forward more stringent requirements, linear actuators toward the direction of high integration, smaller size, higher load capacity, and faster response. The linear driving mechanism is a kind of linear actuator, which adopts the screw as the active part and the actuator as the linear output, i.e. the actuator does not rotate but does telescopic operation along the axial direction, and the screw rotates in the way of operation.

In the linear actuator of the related art, the plastic slide rail is assembled between the housing and the actuator, and the plastic gear ring is assembled between the housing and the gear set. However, the long dimensional chain relationship caused by the multi-part assembly in the traditional linear actuator adversely affects the processing of the parts, the assembly efficiency, and the transmission performance.

Therefore, it is necessary to provide a new linear driving mechanism to solve the above technical problems.

SUMMARY

An object of the present application is to provide a linear driving mechanism that reduces the number of parts of a driving assembly, thereby enhancing assembly efficiency and precision.

In order to achieve the above object, the present application provides a linear driving mechanism including a driving assembly and a transmission assembly fixedly connected to each other;

- wherein the driving assembly includes a first housing, a stator assembly provided within the first housing, and a rotor assembly provided within the stator assembly, wherein the rotor assembly is arranged through an end of the first housing close to the transmission assembly, and the stator assembly is configured to drive the rotor assembly to rotate;
- the transmission assembly includes a second housing, a first cover plate fixed to an end of the second housing away from the driving assembly, a gear assembly mounted on an end of the second housing close to the driving assembly, a screw rod fixed in the second housing and located on a side of the gear assembly away from the driving assembly, a push rod provided in the second housing and located on a side of the screw rod away from the driving assembly, and a connector located at an end of the gear assembly close to the driving assembly and rotatably connected to the gear assembly, wherein an end of the connector close to the driving assembly is fixedly connected to an output end of the rotor assembly, the push rod is arranged through the first cover plate and forms a sliding connection with the first cover plate, and the screw rod forms a linear transmission connection with the push rod;
- the second housing includes a hollow housing body, a gear ring formed in the housing body by a recess extending from an end of the housing body close to the driving assembly toward an end of the housing body away from the driving assembly, and a slide rail formed by recessing an inner peripheral side of the housing body, wherein the slide rail extends from the end of the housing body away from the driving assembly to the end of the housing body close to the driving assembly; the gear assembly is supported on a side of the gear ring close to the driving assembly and is engaged with the gear ring, and the push rod forms a sliding connection with the slide rail.

In one embodiment, the second housing is injection molded in one piece using plastic particles.

In one embodiment, the plastic particles have a yield strength of greater than or equal to 475 MPa and a tensile strength of greater than or equal to 330 MPa in an environment of 23~30° C.

In one embodiment, the plastic particles are polyether ether ketone (PEEK) substrate, and the plastic particles include at least 40% of carbon fibers in terms of mass percentage.

In one embodiment, an end of the push rod away from the driving assembly is provided with a pinhole formed through the push rod along a radial direction of the push rod.

In one embodiment, the driving assembly further includes a bearing coaxially provided with the screw rod and fixedly welded to an end of the screw rod close to the driving assembly, wherein an outer peripheral side of the bearing is fixed to an inner peripheral side of the second housing.

In one embodiment, the housing body further includes a plurality of screw hole posts fixed to the outer peripheral side of the bearing and distributed along an axial direction of the bearing, wherein a plurality of screws are arranged through the plurality of the screw hole posts, respectively, to fix the bearing in the second housing.

In one embodiment, the connector includes a connector body fixedly connected to the output end of the rotor assembly and a transmission portion formed by the connector body extending along a direction toward the screw rod, wherein the transmission portion is engaged with the gear assembly.

In one embodiment, the gear assembly includes a fixing bracket fixed to an end of the screw rod close to the driving assembly, a plurality of fixing posts extending from the fixing bracket toward the driving assembly, and a plurality of gears sleeved on the fixing posts, respectively, and rotatably connected to the fixing posts, wherein the plurality of the gears are engaged in turn and engaged with the gear ring, and one of the gears is engaged with the transmission portion.

In one embodiment, the gears include three and have different outer diameters, and the three gears are engaged sequentially from smallest to largest.

In one embodiment, the slide rail includes a side wall formed by recessing the housing body from the end of the housing body away from the driving assembly to the end of the housing body close to the driving assembly, and a plurality of limiting walls formed by the side wall extending along a radial direction of the push rod, wherein the plurality of the limiting walls are spaced apart from each other and tangent to the push rod.

In one embodiment, the rotor assembly includes a rotor shaft supported in the first housing and rotatably connected to the first housing, an iron core fixedly sleeved on the rotor shaft, and a permanent magnet fixedly sleeved on the iron core, wherein the permanent magnet is spaced apart from the stator assembly, and the rotor shaft is arranged through the first housing and fixedly connected to the connector.

Compared with the related art, the present application forms the second housing by integrating the slide rail, the gear ring, and the housing, which is conducive to improving the assembly efficiency and precision of the linear driving mechanism. The second housing adopts high-strength plastic particles to be molded through a mold injection, which facilitates mass production and ensures more stable dimensions. The gear ring of the second housing cooperates with the gear assembly to realize the deceleration function of the driving assembly. Besides, due to the further release of the space of the gear assembly, it is convenient to design the gear assembly with a larger deceleration ratio and higher strength. The slide rail of the second housing cooperates with the push rod to realize the commutation function of the transmission assembly, i.e. to convert the rotary motion of the actuator into the demanded linear motion, the straight edge of the slide area can limit the four degrees of freedom of the push rod, and realizes the control of the actuator's linear motion together with the screw rod. The second housing is designed with screw holes on the peripheral side of the bearing to realize the positioning function of the screw rod of the transmission assembly through the screw lock attachment of the bearing. The screw rod and bearing are connected by welding, which eliminates the traditional threaded connection and makes the connection more stable and reliable. The push rod eliminates the sliding ring and threaded interface and replaces it with a pinhole, which is fixed in the direction of the pinholes and provides a higher degree of consistency with the external interface. Reducing the number of parts through high integration not only simplifies the transmission mechanism, but also improves the assembly efficiency and precision, reduces production costs, and facilitates batch production.

BRIEF DESCRIPTION OF THE DRAWINGS

In order to more clearly illustrate the technical solutions in the embodiments of the present application, the accompanying drawings to be used in the description of the embodiments will be briefly introduced below. Obviously, the accompanying drawings in the following description are only some embodiments of the present application, and for the person of ordinary skill in the field, other accompanying drawings may be obtained based on these drawings without putting in creative labor.

In the figures, 100, linear driving mechanism; 1, driving assembly; 11, first housing; 111, first housing body; 112, second cover plate; 12, stator assembly; 13, rotor assembly; 131, rotor shaft; 132, iron core; 133, permanent magnet; 2, transmission assembly; 21, second housing; 211, housing body; 212, slide rail; 2121, side wall; 2122, limiting wall; 213, gear ring; 214, screw hole post; 22, first cover plate; 23, push rod; 231, pinhole; 24, screw rod; 25, gear assembly; 251, fixing bracket; 252, fixing post; 253, gear; 26, connector; 261, connector body; 262, transmission portion; 27, bearing; 28, screw; 3, sensor assembly; 31, control board; 32, Hall sensor; and 33, sensor magnet.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by a person of ordinary skill in the art without making creative labor fall within the scope of protection of the present application.

Figure 1:
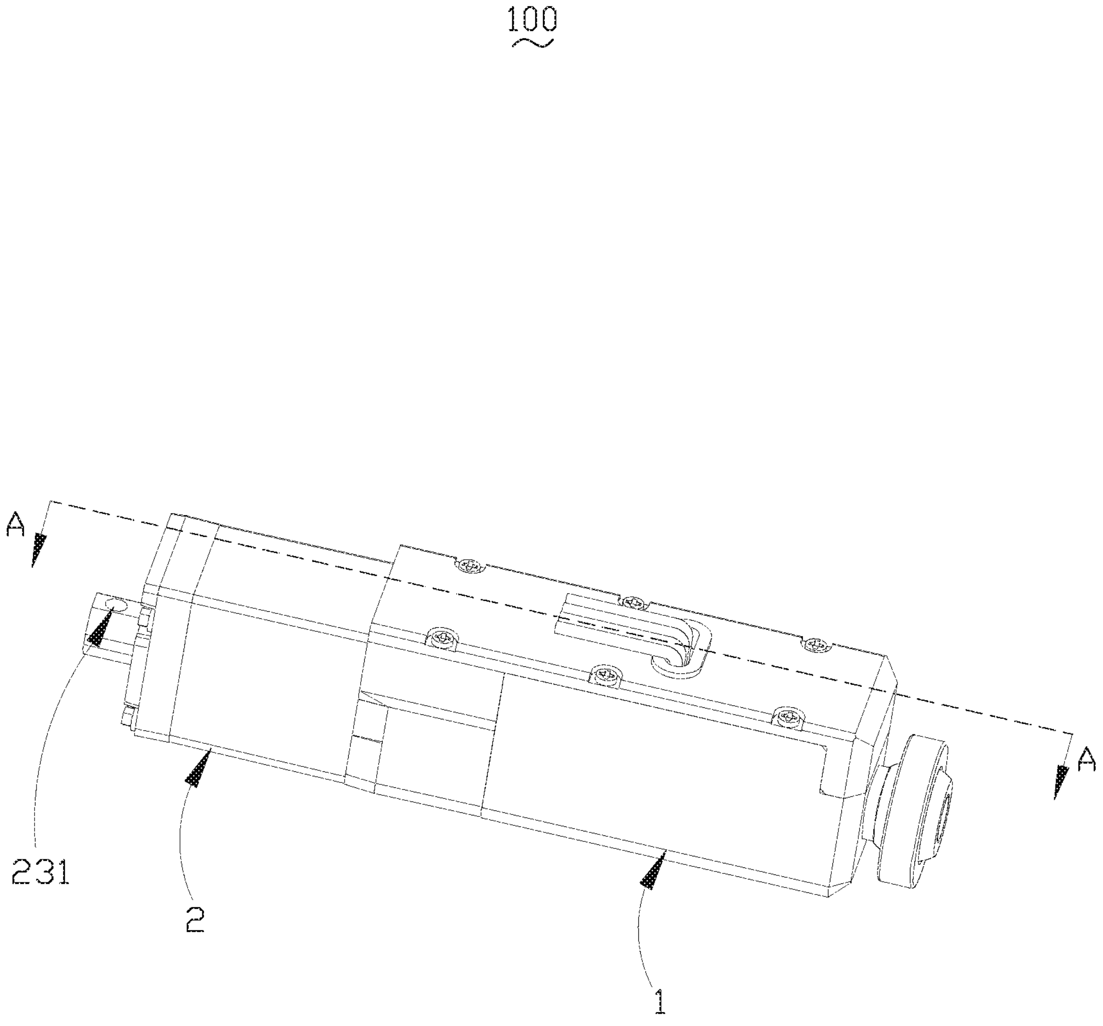
FIG. 1 shows a schematic diagram of a three-dimensional structure of a linear driving mechanism according to an embodiment of the present application.
Figure 2:
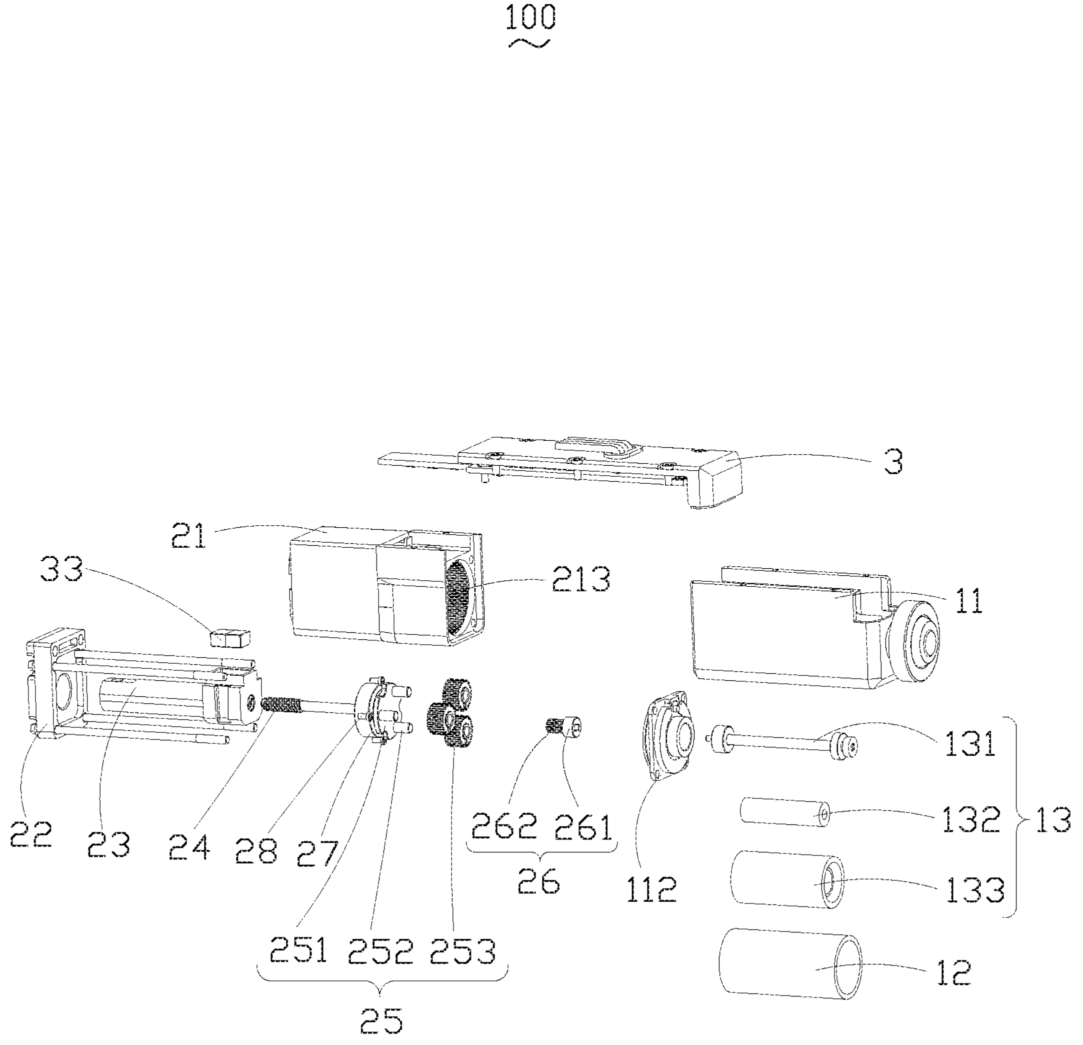
FIG. 2 shows an exploded view of the three-dimensional structure of the linear driving mechanism according to an embodiment of the present application.
Figure 3:
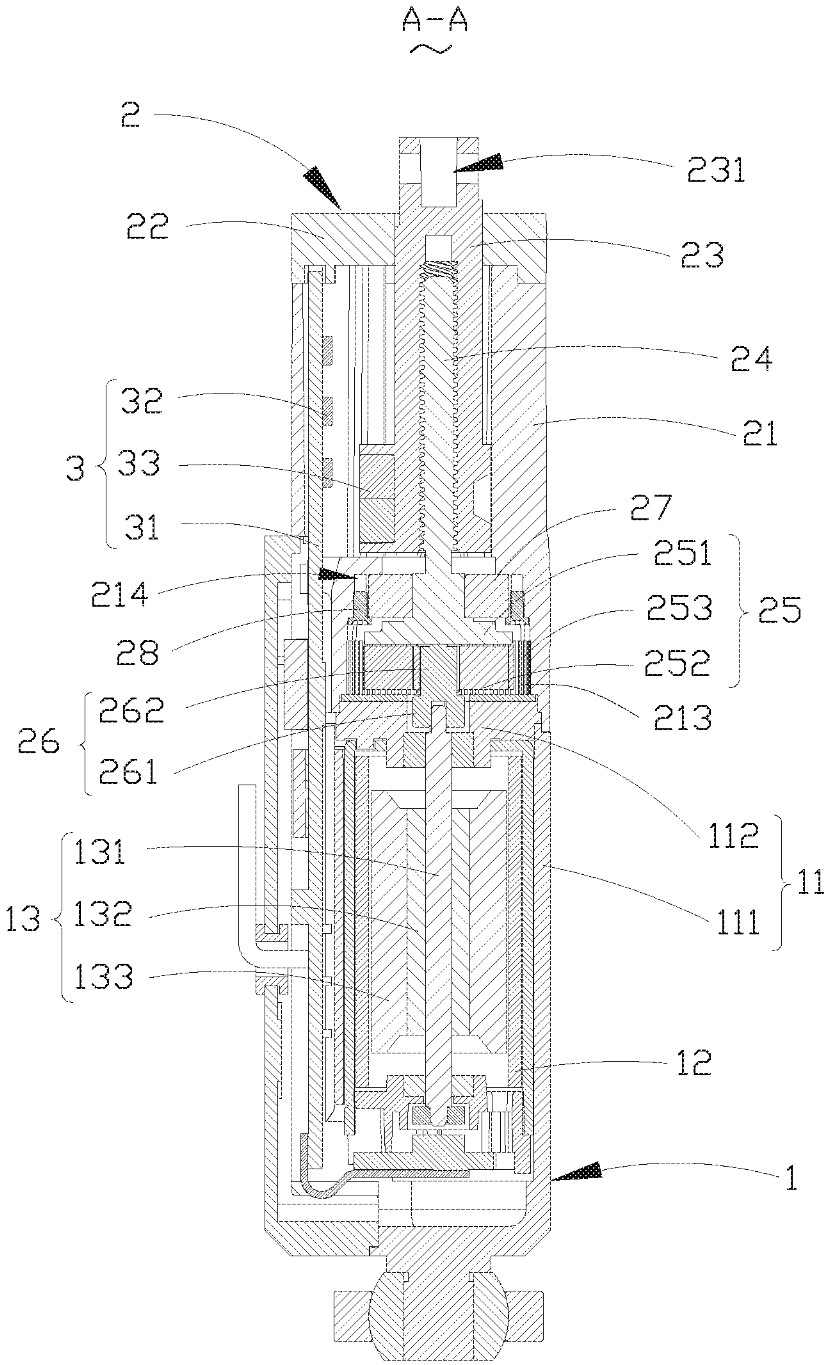
FIG. 3 shows a sectional view of the linear driving mechanism in FIG. 1 along line A-A.
Figure 4:
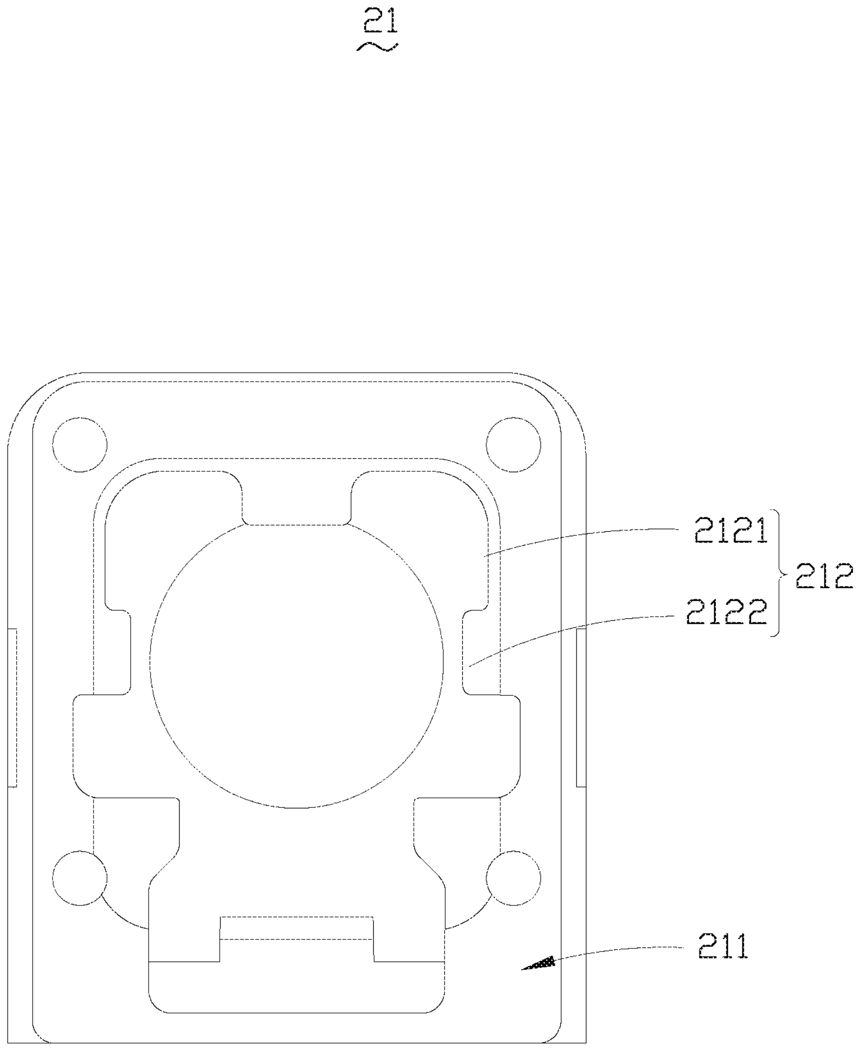
FIG. 4 shows a schematic structural diagram of a slide rail side of a second housing of the linear driving mechanism according to an embodiment of the present application.
Figure 5:
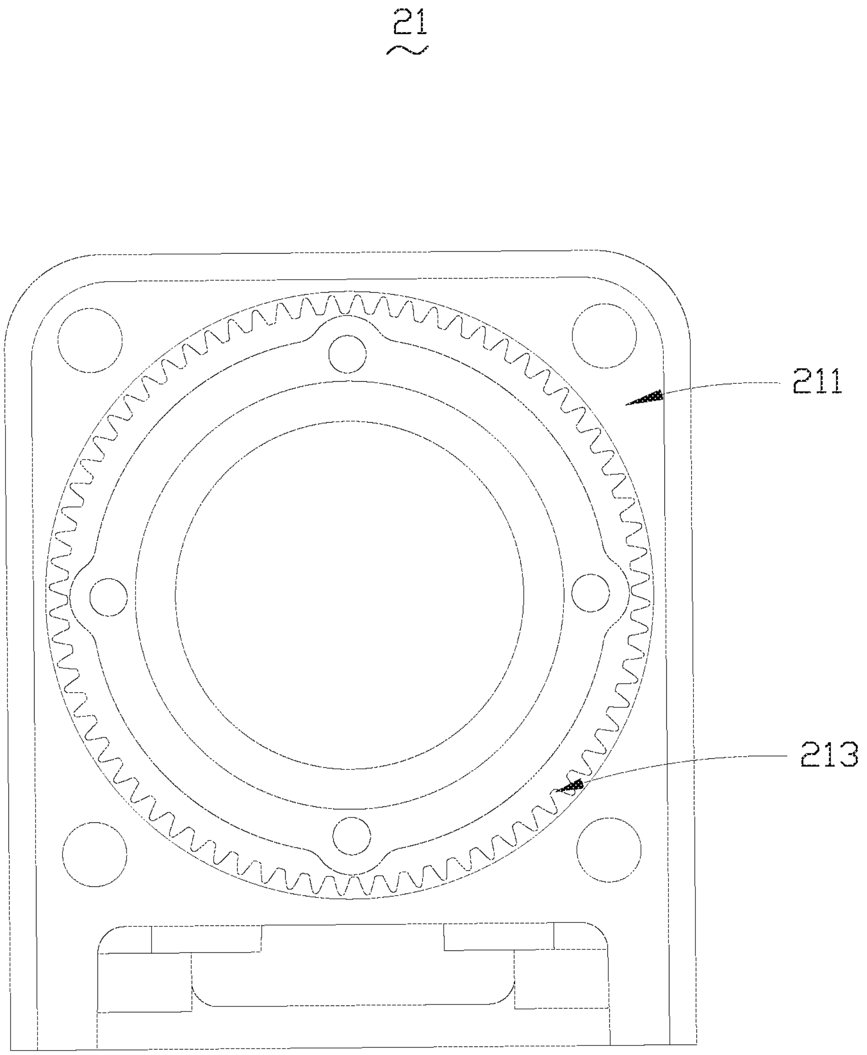
FIG. 5 shows a schematic structural diagram of a gear ring side of the second housing of the linear driving mechanism according to an embodiment of the present application.

Combined with FIGS. 1 to 5, embodiments of the present application provide a linear driving mechanism 100 including a driving assembly 1 and a transmission assembly 2 fixedly connected to each other.

The driving assembly 1 includes a first housing 11, a stator assembly 12 provided within the first housing 11, and a rotor assembly 13 provided within the stator assembly 12. The rotor assembly 13 is arranged through an end of the first housing 11 close to the transmission assembly 2, and the stator assembly 12 drives the rotor assembly 13 to rotate.

The transmission assembly 2 includes a second housing 21, a first cover plate 22 fixed to an end of the second housing 21 away from the driving assembly 1, a gear assembly 25 mounted on an end of the second housing 21 close to the driving assembly 1, a screw rod 24 fixed in the second housing 21 and located on a side of the gear assembly 25 away from the driving assembly 1, a push rod 23 provided in the second housing 21 and located on a side of the screw rod 24 away from the driving assembly 1, and a connector 26 located at an end of the gear assembly 25 close to the driving assembly 1 and rotatably connected to the gear assembly 25. An end of the connector 26 close to the driving assembly 1 is fixedly connected to an output end of the rotor assembly 13. The push rod 23 is arranged through the first cover plate 22 and forms a sliding connection with the first cover plate 22, and the screw rod 24 forms a linear transmission connection with the push rod 23.

The second housing 21 includes a hollow housing body 211, a gear ring 213 formed by recessing the housing body 211 from an end of the housing body 211 close to the driving assembly 1 to an end of the housing body 211 away from the driving assembly 1, and a slide rail 212 formed by recessing an inner peripheral side of the housing body 211. The slide rail 212 extends from the end of housing body 211 away from the housing body 211 close to the end of the housing body 211 close to the driving assembly 1. The gear assembly 25 is supported on a side of the gear ring 213 close to the driving assembly 1 and is engaged with the gear ring 213, and the push rod 23 forms a sliding connection with the slide rail 212.

Specifically, the gear ring 213 in the second housing 21 cooperates with the gear assembly 25 to realize the deceleration function of the transmission assembly 2. Besides, due to the further release of the space of the gear assembly 25, it is more convenient for the design of the gear assembly 25 with a larger deceleration ratio and a higher strength. The slide rail 212 in the second housing 21 cooperates with the push rod 23 to realize the direction-change function of the transmission assembly 2 (i.e., to convert the rotary motion of the push rod 23 into the required linear motion).

The stator assembly 12 drives the rotor assembly 13 to rotate the screw rod 24, thereby causing the screw rod 24 to rotate to drive the push rod 23 to realize linear telescopic motion.

In this embodiment, the second housing 21 is injection molded in one piece using plastic particles. Specifically, the plastic particles are high-strength plastic particles. The second housing 21 is injection molded in one piece using high-strength plastic particles, which is conducive to mass production and is more stable in size. Exemplarily, the plastic particles have a yield strength of greater than or equal to 475 MPa and a tensile strength of greater than or equal to 330 MPa in an environment of 23~30° C. The plastic particles are polyether ether ketone (PEEK) substrate, which includes at least 40% of carbon fibers in terms of mass percentage.

In this embodiment, one end of the push rod 23 away from the driving assembly 1 is provided with a pinhole 231 formed through the push rod 23 along the radial direction of the push rod 23. Since the push rod 23 eliminates the sliding ring, and threaded interface and replaces it with the pinhole, and the direction of the pinhole 231 is fixed, the consistency of the fit with the external interface is higher. Reducing the number of parts through high integration not only simplifies the structure of the transmission assembly 2, but also improves the assembly efficiency and precision of the linear driving mechanism 100, reduces the production cost, and facilitates mass production.

In this embodiment, the transmission assembly 2 further includes a bearing 27 coaxially provided with the screw rod 24 and fixedly welded to an end of the screw rod 24 close to the driving assembly 1. An outer peripheral side of the bearing 27 is fixed to an inner shaft side of the second housing. The screw rod 24 and the bearing 27 are connected by welding, eliminating the threaded connection method in the prior art, and the connection is more stable and reliable.

In this embodiment, the housing body 211 further includes a plurality of screw hole posts 214 fixed to the outer peripheral side of the bearing 27 and distributed along an axial direction of the bearing 27. A plurality of screws 28 are arranged through the plurality of the screw hole posts 214, respectively, to fix the bearing 27 in the second housing 21. Specifically, the screws 28 are self-tapping screws, and the locking attachment of the bearing 27 by the screws 28 realizes the positioning function of the screw rod 24.

In this embodiment, the connector 26 includes a connector body 261 fixedly connected to the output end of the rotor assembly 13 and a transmission portion 262 formed by the connector body 261 extending along a direction toward the push rod 24, the transmission portion 262 being engaged with the gear assembly 25.

In this embodiment, the gear assembly 25 includes a fixing bracket 251 fixed to an end of the screw rod 24 close to the driving assembly 1, a plurality of fixing posts 252 extending from the fixing bracket 251 toward the driving assembly 1, and a plurality of gears 253 sleeved on the fixing posts 252, respectively, and rotatably connected to the fixing posts 252. The plurality of gears 253 are sequentially engaged in turn and engaged with the gear ring 213, and one of the gears 253 is engaged with the transmission portion 262.

In this embodiment, there are three gears 25 that are spaced apart from each other and of different outer diameters. The three gears 253 are engaged sequentially from smallest to largest. By controlling the size of the outer diameters of the three gears 253, the rotational speeds of the plurality of gears 253 can thus be controlled to control the speed of the linear transmission of the screw rod 24 and the push rod 23.

In this embodiment, the slide rail 212 includes a side wall 2121 formed by recessing the housing body 211 from the end of the housing body 211 away from the driving assembly 1 towards the end of the housing body 211 close to the driving assembly 1, and a plurality of limiting walls 2122 formed by the side wall 2121 extending along a radial direction of the push rod 23. The plurality of the limiting walls 2122 are spaced apart from each other and tangent to the push rod 23. By limiting the degrees of freedom of the push rod 23 by the plurality of limiting walls 2122, control of the linear movement of the push rod 23 is realized together with the screw rod 24.

In this embodiment, the rotor assembly 13 includes a rotor shaft 131 supported in the first housing 11 and rotatably connected to the first housing 11, an iron core 132 fixedly sleeved on the rotor shaft 131, a permanent magnet 133 fixedly sleeved on the iron cores 132. The permanent magnets 133 is spaced apart from the stator assembly 12, and the rotor shaft 131 is arranged through the first housing 11 and fixedly connected to the connectors 26.

In this embodiment, the first housing 11 includes a first housing body 111 and a second cover plate 112 covering an end of the first housing body 111 close to the transmission assembly 2. An end of the second cover plate 112 away from the first housing body 111 is fixedly connected to the second housing 21, and the rotor shaft 131 is arranged through the first housing body 111 and rotatably connected to the connector 26.

In this embodiment, the linear driving mechanism 100 further includes a sensor assembly 3, which is configured to detect movement data of the push rod 23. The sensor assembly 3 including a control board 31 embedded and fixed within the first housing 11 and the second housing 21, a Hall sensor 32 fixed to an end of the control board 31 close to the push rod 23, and a sensor magnet 33 fixed to the second housing 21. The sensor magnet 33 and the Hall sensor 32 are spaced apart from each other.

Compared with the prior art, the present application forms the second housing by integrating the slide rail, the gear ring, and the housing, which is conducive to improving the assembly efficiency and precision of the linear driving mechanism. The second housing adopts high-strength plastic particles to be molded through a mold injection, which facilitates mass production and ensures more stable dimensions. The gear ring of the second housing cooperates with the gear assembly to realize the deceleration function of the driving assembly. Besides, due to the further release of the space of the gear assembly, it is convenient to design the gear assembly with a larger deceleration ratio and higher strength. The slide rail of the second housing cooperates with the push rod to realize the commutation function of the transmission assembly, i.e. to convert the rotary motion of the actuator into the demanded linear motion, the straight edge of the slide area can limit the four degrees of freedom of the push rod, and realizes the control of the actuator's linear motion together with the screw. The second housing is designed with screw holes on the peripheral side of the bearing to realize the positioning function of the screw of the transmission assembly through the screw lock attachment of the bearing. The screw rod and bearing are connected by welding, which eliminates the traditional threaded connection and makes the connection more stable and reliable. The push rod eliminates the sliding ring and threaded interface and replaces it with a pinhole, which is fixed in the direction of the pinholes and provides a higher degree of consistency with the external interface. Reducing the number of parts through high integration not only simplifies the transmission mechanism, but also improves the assembly efficiency and precision, reduces production costs, and facilitates batch production.

Described above are only embodiments of the present application, and it should be pointed out that, for the ordinary technical personnel in the field, improvements may also be made without departing from the premise of the concept of the present application, but these are all within the protection scope of the present application.

What is claimed is:

1. A linear driving mechanism comprising:

a driving assembly and a transmission assembly fixedly connected to each other;

wherein the driving assembly comprises:

a first housing, a stator assembly provided within the first housing, and a rotor assembly provided within the stator assembly, wherein the rotor assembly is arranged through an end of the first housing close to the transmission assembly, and the stator assembly is configured to drive the rotor assembly to rotate;

the transmission assembly comprises:

a second housing, a first cover plate fixed to an end of the second housing away from the driving assembly, a gear assembly mounted on an end of the second housing close to the driving assembly, a screw rod fixed in the second housing and located on a side of the gear assembly away from the driving assembly, a push rod provided in the second housing and located on a side of the screw rod away from the driving assembly, and a connector located at an end of the gear assembly close to the driving assembly and rotatably connected to the gear assembly, wherein an end of the connector close to the driving assembly is fixedly connected to an output end of the rotor assembly, the push rod is arranged through the first cover plate and forms a sliding connection with the first cover plate, and the screw rod forms a linear transmission connection with the push rod;

the second housing comprises:

a hollow housing body, a gear ring formed in the housing body by a recess extending from an end of the housing body close to the driving assembly toward an end of the housing body away from the driving assembly, and a slide rail formed in the housing body by a recess in an inner peripheral side of the housing body, wherein the slide rail extends from the end of the housing body away from the driving assembly to the end of the housing body close to the driving assembly; the gear assembly is supported on a side of the gear ring close to the driving assembly and is engaged with the gear ring, and the push rod forms a sliding connection with the slide rail.

2. The linear driving mechanism of claim 1, wherein the second housing is injection molded in one piece using plastic particles.

3. The linear driving mechanism of claim 2, wherein the plastic particles have a yield strength of greater than or equal to 475 MPa and a tensile strength of greater than or equal to 330 MPa in an environment of 23~30° C.

4. The linear driving mechanism of claim 2, wherein the plastic particles are polyether ether ketone (PEEK) substrate, and the plastic particles comprise at least 40% of carbon fibers in terms of mass percentage.

5. The linear driving mechanism of claim 1, wherein an end of the push rod away from the driving assembly is provided with a pinhole formed through the push rod along a radial direction of the push rod.

6. The linear driving mechanism of claim 1, wherein the driving assembly further comprises a bearing coaxially provided with the screw rod and fixedly welded to an end of the screw rod close to the driving assembly, wherein an outer peripheral side of the bearing is fixed to an inner peripheral side of the second housing.

7. The linear driving mechanism of claim 6, wherein the housing body further comprises a plurality of screw hole posts fixed to the outer peripheral side of the bearing and distributed along an axial direction of the bearing, wherein a plurality of screws are arranged through the plurality of the screw hole posts, respectively, to fix the bearing in the second housing.

8. The linear driving mechanism of claim 1, wherein the connector comprises a connector body fixedly connected to the output end of the rotor assembly and a transmission portion formed by the connector body extending along a direction toward the screw rod, wherein the transmission portion is engaged with the gear assembly.

9. The linear driving mechanism of claim 8, wherein the gear assembly comprises a fixing bracket fixed to an end of the screw rod close to the driving assembly, a plurality of fixing posts extending from the fixing bracket toward the driving assembly, and a plurality of gears sleeved on the fixing posts, respectively, and rotatably connected to the fixing posts, wherein the plurality of the gears are engaged in turn and engaged with the gear ring, and one of the gears is engaged with the transmission portion.

10. The linear driving mechanism of claim 1, wherein the slide rail comprises a side wall formed by recessing the housing body from the end of the housing body away from the driving assembly to the end of the housing body close to the driving assembly, and a plurality of limiting walls formed by the side wall extending along a radial direction of the push rod, wherein the plurality of the limiting walls are spaced apart from each other and tangent to the push rod.

11. The linear driving mechanism of claim 1, wherein the rotor assembly comprises a rotor shaft supported in the first housing and rotatably connected to the first housing, an iron core fixedly sleeved on the rotor shaft, and a permanent magnet fixedly sleeved on the iron core, wherein the permanent magnet is spaced apart from the stator assembly, and the rotor shaft is arranged through the first housing and fixedly connected to the connector.

* * * * *